United States Patent
Harris et al.

(10) Patent No.: US 8,208,609 B2
(45) Date of Patent: Jun. 26, 2012

(54) SYSTEM AND METHOD FOR VOICE ACTIVATED DIALING FROM A HOME PHONE

(75) Inventors: Robert Harris, Kansas City, MO (US); Don L. Briscoe, Overland Park, KS (US); Jasen D. Ott, Olathe, KS (US); John Zeigler, Lee's Summit, MO (US); Michael Schmidt, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 435 days.

(21) Appl. No.: 12/335,115

(22) Filed: Dec. 15, 2008

(65) Prior Publication Data

US 2010/0150321 A1  Jun. 17, 2010

(51) Int. Cl.
    *H04M 1/64* (2006.01)
(52) U.S. Cl. ............................... 379/88.03; 379/205.01

(58) Field of Classification Search ............... 379/88.01, 379/88.03, 201.12, 201.02, 205.01, 204.01, 379/202.01, 158, 93.21
See application file for complete search history.

(56) References Cited

U.S. PATENT DOCUMENTS

| | | | | |
|---|---|---|---|---|
| 5,452,340 A * | 9/1995 | Engelbeck et al. | ......... | 379/88.03 |
| 5,835,570 A * | 11/1998 | Wattenbarger | ............. | 379/88.03 |
| 5,991,364 A * | 11/1999 | McAllister et al. | ......... | 379/88.01 |
| 6,963,633 B1 * | 11/2005 | Diede et al. | ................. | 379/88.03 |
| 2010/0220843 A1 * | 9/2010 | Bosan et al. | ................ | 379/88.22 |

* cited by examiner

*Primary Examiner* — Olisa Anwah
(74) *Attorney, Agent, or Firm* — Swanson & Braschun, L.L.C.

(57) ABSTRACT

A system and method for remotely enabled voice activated dialing. Generation of a special dial tone indicating that a user may give the voice identifier is initiated. A voice identifier is received over a network from a wired telephone utilized by a user. Dialing information associated with the voice identifier is determined. One or more receiving parties associated with the voice identifier are dialed. The wired telephone is connected to the one or more receiving parties.

18 Claims, 4 Drawing Sheets

SYSTEM AND METHOD FOR VOICE
ACTIVATED DIALING FROM A HOME
PHONE

CROSS-REFERENCE TO RELATED APPLICATIONS

This application incorporates by reference U.S. Utility application Ser. No. 11/714,359, entitled: System and Method for Voice-Activated Dialing Over Implicit and Explicit NFA Trunks, as filed on Mar. 6, 2007.

BACKGROUND OF THE INVENTION

The usage of communications and communications related services has grown nearly exponentially in recent years. This growth is fostered by enhanced standards, protocols, networks, and devices. Many wireless technologies have drastically changed how users communicate daily. During that same time period, the traditional home phone lines and related technologies have not changed significantly. As a result, most users still communicate through a home phone line or home phone using a traditional phone, base station, or handset in the same way they always have.

BRIEF SUMMARY OF THE INVENTION

One embodiment provides a system and method for remotely enabled voice activated dialing. Generation of a special dial tone indicating that a user may give the voice identifier may be initiated. A voice identifier may be received over a network from a wired telephone utilized by a user. Dialing information associated with the voice identifier may be determined. One or more receiving parties associated with the voice identifier may be dialed. The wired telephone may be connected to the one or more receiving parties.

Another embodiment provides a system for voice activated dialing. The system may include a communications network in communication with a wired telephone through a connection. The communications network may be operable to communicate the voice identifier received from a user of the wired telephone. The system may also include a gateway in communication with the communications network. The gateway may be operable to communicate the voice identifier to a server for implementing voice dialing. The system may also include the server in communication with the communications network. The server may be operable to receive the voice identifier through the gateway. The server may be further operable to determine dialing information associated with the voice identifier, dial one or more receiving parties associated with the voice identifier, and connect the wired telephone to the one or more receiving parties.

Yet another embodiment provides a server remotely enabling voice activated dialing. The server may include a processor for executing a set of instructions and a memory in communication with the processor. The memory may be operable to store the set of instructions. The set of instructions may BE executed to initiate generation of a special dial tone indicating that a user may give a voice identifier, receive a voice identifier over a network from a wired telephone utilized by a user, determine dialing information associated with the voice identifier, dial one or more receiving parties associated with the voice identifier, and connect the wired telephone to the one or more receiving parties.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

An illustrative embodiment provides a system and method for voice activated dialing. In one embodiment, a user accessing a wired telephone may speak or give a voice command or voice identifier. The voice identifier is a verbal command associated with one or more receiving parties or contacts to be called. The voice identifier may be linked or associated with dialing or contact information for the one or more receiving parties. The voice identifier may be communicated to a server or other network device that determines the dialing information associated with the voice identifier and initiates a call to the designated one or more receiving parties accordingly.

In one embodiment, any number of servers, gateways, switches, databases, central offices, remote nodes, or other connections, devices, equipment, of systems may be utilized to implement the voice activated dialing. In one embodiment, the user may receive a specialized prompt when taking the phone off-hook, or otherwise, electing to make a call. The prompt may indicate to the user that a voice identifier may be spoken or otherwise uttered. In another embodiment, the user may speak the voice identifier without a specialized prompt or indicator.

The wired telephone may be utilized in a home, business, organization, or other location and may be a plain old telephone systems (POTS) phone, a voice over Internet protocol (VoIP) phone, digital phone, or any other number of wired or fixed home communications devices or telephonic systems.

Figure 1:
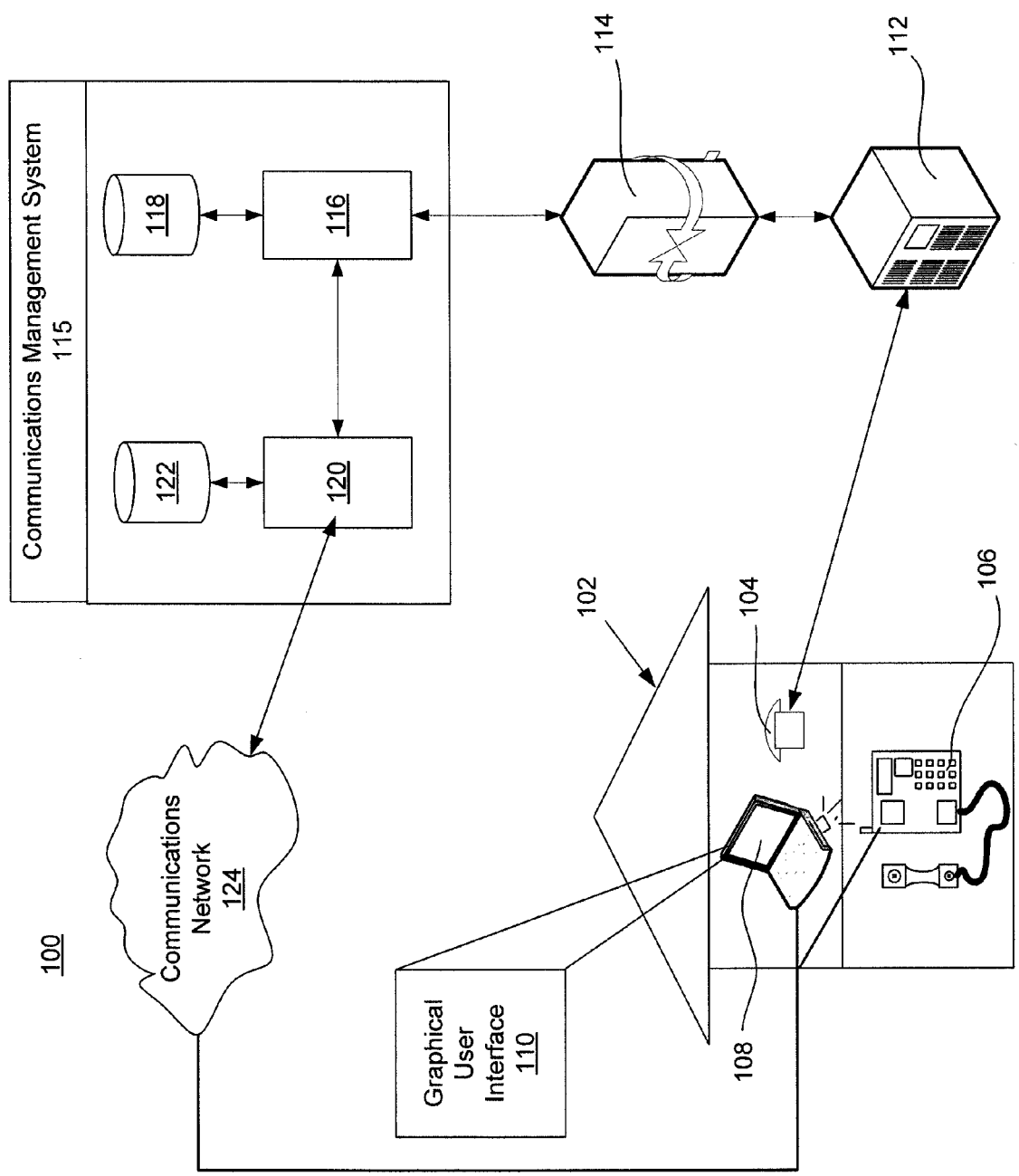
FIG. 1 is a pictorial representation of a communication environment in accordance with an illustrative embodiment.

FIG. 1 is a pictorial representation of a communication environment 100 in accordance with an illustrative embodiment. The communications environment 100 may include various elements, devices, and systems utilized for voice communication. The communications environment 100 of FIG. 1 is shown for illustrative purposes only and is not intended to limit the types of environment, conditions, or configurations that may be utilized to perform voice activated dialing, as herein described.

In one embodiment, the communications environment 100 may include a home 102, a telephone 104, a VoIP telephone 106, a client 108, a GUI 110, a switch 112, a gateway 114, a communications management system 115, a voice activated dialing (VAD) server 116, a VAD database 118, a network address book (NAB) server 120, a NAB database 122, and a communications network 124.

The home 102 is an example of a dwelling, residence, or location of a person or group utilizing a number of communications services. The home 102 is shown as a residence in the illustrative embodiment, however, the home 102 may also be an office, business, structure, or other location suitably equipped to provide telephone data and other communication services to one or more users.

In one embodiment, the home 102 includes or is equipped with multiple communications devices, including the telephone 104, the client 108, and the VoIP telephone 106. The telephone 104 and the VoIP telephone 106 may be standard devices that provide dialing and voice conversation capabilities to a user. In one embodiment, the telephone 104 may utilize a POTS connection provided to the home 102 from the switch 112. The connection between the switch 112 and the telephone 104 may include any number of wires, connectors, intermediary devices, amplifiers, routers, switches, repeaters, or other equipment utilized to communicate the POTS communications to the telephone 104.

The VoIP telephone 106 is one embodiment of a telephone operable to send and receive voice communications through data or packets transmitted over a data network. As shown, the VoIP telephone 106 and the client 108 may communicate with the communications network 124. The connection between the VoIP telephone 106, client 108, and communications network 124 may be a data connection. The communications and computing devices of the home 102 may communicate with the switch 112 and the communications network 124 utilizing any number of connection type standards and protocols, including, but not limited to, fiber optics, cable, DSL, high speed trunks, dial-up connections, and standard telephone lines.

In another embodiment, the communications environment 100 may include wireless communications, such as satellite connections, WiFi, WiMAX, time division multiple access (TDMA), code division multiple access (CDMA), global systems mobile (GSM), communications, personal communications systems (PCS), or other frequently used cellular or wireless communications standards, protocols, or wireless connections. Communications within the communications environment 100 may appear on any number of networks which may include data or packet networks, cable networks, satellite networks, private networks, publicly-switched telephone networks (PSTN), wireless networks, or other types of wired communications networks. A communications network is infrastructure for sending and receiving messages and signals according to one or more designated formats, standards, and protocols.

The networks connection and devices of the communications environment 100 may represent a single communications service provider or multiple communications service providers. The feature services and processes of the illustrative embodiment may be implemented by one or more elements of the communications environment 100, independently or as a networked implementation. In one embodiment, the telephone 104 and the VoIP telephone 106 do not require specialized hardware, software, or features in order to enable the user to perform voice activated dialing. The elements of the communications environment 100 including the communications network 124, communications management system 115, gateway 114, and switch 112 may communicate using a signal control protocol, such as signaling system 7 (SS7) protocol, or TCP/IP protocols. The SS7 protocol or similar protocols are used in publicly-switched networks for establishing connections between switches, performing out-of-band signaling in support of the call establishment, billing, routing, and implementing information exchange functions of a publicly-switched network or other networks of the communications environment 100.

The switch 112 may be owned and operated by a local exchange carrier or other service provider that provides standard telephone service to any number of users. In one embodiment, the switch is a local exchange or class 5 switch that is part of the network system of a local carrier. The switch 112 may be connected to any number of other systems, devices, and connections that are not explicitly described herein for purposes of simplicity. The switch 112 may also be a digital subscriber line access multiplexer (DLSAM), Internet protocol (IP), gateway, base station, or other suitable access point. In one embodiment, the switch 112 may be a wire-line switch or public exchange using time domain multiplexing (TDM) to provide telecommunications services to a particular user or group of users. The switch 112 may be located at a local telephone company's central office or at a business location serving as a private branch exchange. The switch 112 may provide dial tone, calling features, and additional digital and data services to VoIP, such as the telephone 104. The switch 112 and/or the communications network 124 may also enable VoIP communications for the VoIP telephone 106. VoIP functions by communicating voice information in digital form, such as packets, rather than by using the traditional circuit committed protocols of the publicly-switched network. The switch 112 or communications network 124 may be, or include, a feature server, a call control agent, or gateway for implementing voice communications.

In one embodiment, the voice activated dialing may be delivered through use of network facility access (NFA) trunk. In one embodiment, a dial tone, indicator, prompt, or other feedback may specify that the voice activated dialing feature or server is available to the user. For example, the telephone 104 and VoIP telephone 106 may play a double chirp when implementing the voice activated dialing feature. The special dial tone may be generated by any number of devices in the communications environment 100. In one embodiment, the user may cancel the use of voice activated dialing by entering a command, such as a button sequence, voice command, or accessing features available through the web portal. As a result, the user may be able to lift the receiver or activate a line and then speak a name, keyword, command, phrases, or voice identifier into the handset of the telephone 108 or VoIP phone 106. The user's voice may then be sent via a public or private line to the communications management system 114 or a call server complex. The communications management system 114 may utilize voice recognition to identify or determine the voice identifier and dialing information associated with the voice identifier for communications to the switch 112, node, or office for regular call processing. The call processing may alternatively be implemented from the communications management system 114 for connection through the switch 112.

The client 108 may be a personal computer for performing and executing programs and instructions and accessing one or more networks including the communications network 124. However, the client 108 may be any computing device suitable for communicating with the communications network 124 through a network connection, be it wired or wireless. For example, the client 108 may be a personal computer, a laptop, a personal digital assistant (PDA), or other computing device including communications features, hardware, and software. In one embodiment, the user may access the client 108 to specify preferences and information that are utilized by the communications management system 114 to implement the voice activated dialing.

The GUI 110 is an interactive interface for displaying information to the user to the client 108 and receiving user input. The GUI 110 may be configured to receive text, data, information, verbal commands, tactile commands, and other user inputs based on the configuration of the client 108 and the user's capability. In one embodiment, the GUI 110 is a web portal provided by the communications management system 114 for managing the voice activated dialing configuration and services provided to at least the telephone 104 and voice telephone 106. In one embodiment, the web portal may be utilized to add and remove network address contacts stored within the NAB database 122 utilized by the NAB server 120. The contact may be associated with a voice identifier which is a voice command linked with specific dialing information. Once the user provides the voice identifier through the telephone 104 or the VoIP telephone 106, the voice activated dialing is implemented.

In one embodiment, the user may be required to enter a pass code, password, account code, pin number, or other identifier to enter information in the GUI 110 for configuring the voice activated dialing settings or configuration. Similarly, the user may be required to speak a password, key word, or other information while using the telephone 104 or VoIP telephone 106 to initiate voice activated dialing.

The gateway 114 is a network node equipped for interfacing communications between the switch 112 and the communications management system 115. In one embodiment, the gateway may be a TDM to IP gateway. The switch 112 and gateway 114 may communicate through multiple lines or connections, such as multiple DS1 connections. The gateway 114 may record any number of devices and modules, including, protocols, translators impedance matching devices, rate converters, false isolators, or signal translators as necessary to provide systems inoperability. In particular, the gateway 114 may be utilized in response to receiving a voice identifier from a user accessing the telephone 104 or the VoIP telephone 106.

In one embodiment, the gateway 114, switch 112, or the communications management system 115 may include a trigger configured to implement the voice activated dialing process. In one embodiment, the respective devices may be alerted when the telephone 104 or the VoIP telephone 106 is taken off the hook in order to generate a special dial tone or prepare to implement voice activated dialing based on receiving one or more voice identifiers. In one embodiment, the gateway 114 may translate the voice identifier into a protocol or standard understandable to the VAD server 116 and NAB server 120.

The communications management system 115 is one or more devices utilized to enable, initiate, route, and manage communications between one or more telephonic devices. The communications management system 115 may include one or more devices networked to manage the communications network 124, as well as, the gateway 114 and switch 112, including the functions, services, and signals utilized by the respective devices. For example, the communications management system 115 may include any number of servers, routers, switches, databases, advanced intelligent devices, or other network systems and equipment. The devices of the communications management system 115 may communicate utilizing any number of standards or protocols.

In one embodiment, the VAD server 116, NAB server 120, NAB database 122, and VAD database 118 may communicate utilizing an Ethernet connection. The communications network 124, gateway 114, and switch 112 may be extensions of the communications management systems 115. In one embodiment, the VAD server 116 and the NAB server 120 are computing devices configured to implement logic, applications, and other actions based on the voice identifier received from the user. Similarly, the VAD server 116 and the NAB server 120 may store user preferences, configurations, parameters, and settings for controlling the voice activated dialing services available to the user through the telephone 104 and the voice telephone 106.

The VAD database 118 and the NAB database 122 are storage devices, collectors of records and data, constructs, or interfaces that store voice activated dialing information and network address information, respectively. In one embodiment, the VAD database 118 may store voice identifiers that may be utilized by the user to implement a call to a receiving party or contact. Similarly, the NAB database 122 may compile and/or store network address books, directions, lists, and contacts, including dialing information for communicating with one or more receiving parties based on the receipt of a voice identifier. The dialing information may be sent to the switch to dial and connect the call.

The NAB server 120 may access the NAB database 122 to update, modify, or change associations between the voice identifier and the dialing information based on user input. The user input may be received through a web portal or an interactive voice response (IVR) system or voice platform managed and controlled by the communications management system 115. In another embodiment, the communication management system 115 may utilize the described devices or any number of other servers, computers, or network devices to implement the web portal and IVR system.

The VAD server 116 and the NAB server 120 may work together to receive a voice identifier, associate the voice identifier with one or more receiving parties, and utilize the voice identifier to determine dialing information utilized to implement a call to the one or more receiving parties. As a result, the necessary voice activated dialing information and network address information is retrieved from the VAD database 118 and the NAB database 122, respectively. In one embodiment, the VAD database 118 and the NAB database 122 may be an integrated portion of the VAD server 116 and the NAB server 120.

The VAD server 116 may interpret conversational speech so that the appropriate receiving parties may be dialed from the switch 112. For example, if the user has stored Fred Brown as a receiving party associated with a voice identifier and dialing information, the user may say "Call Fred Brown on his cell" to be connected to Fred Brown's cellular or mobile telephone. Additionally, the user may voice dial a number by saying the number. In one embodiment, the user may send a voice email to a contact utilizing the same steps and processes herein described. The communications management system 115 may utilize a voice-to-text application to generate the text utilized and the voice identifier may be associated with the appropriate email address. In one embodiment, a user may call a receiving party based on call information available through the telephone 104 or VoIP phone 106, which may include caller identification information.

Figure 2:
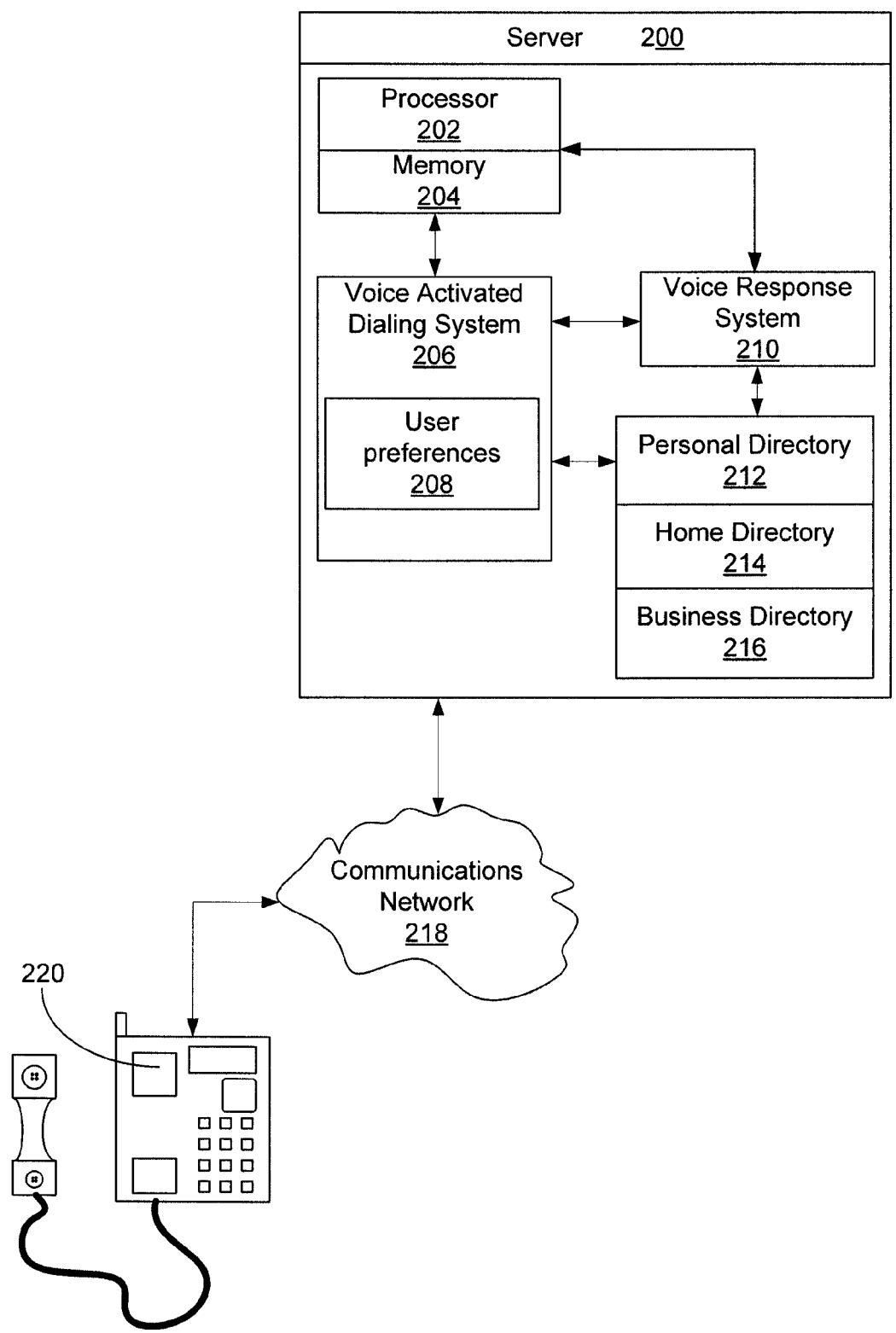
FIG. 2 is a block diagram of a server for voice activated communications in accordance with an illustrative embodiment.

FIG. 2 is a block diagram of a server for voice activated communications in accordance with an illustrative embodiment. The server 200 is a particular implementation of the VAD server 116, VAD database 108, NAB server 120, and NAB database 122 of FIG. 1. The server 200 may include a processor 202, a memory 204, a VAD system 206, user preferences 208, a voice response system 210, a personal directory 212, a home directory 214, and a business directory 216. The server 200 may further communicate with a communications network 218 and a telephone 220. The server 200 may further include any number of other computing and communications hardware and software, including busses, circuits, cards, ports, interfaces, mother boards, transceivers, and other similar elements.

The processor 202 is circuitry or logic enabled to control execution of a set of instructions. The processor 202 may be a microprocessor, digital signal processor, central processing unit, or other device suitable for controlling an electronic device, including one or more hardware and software elements, executing software, instructions, programs, and applications, converting and processing signals and information, and performing other related tasks. The processor 202 may be a single chip or integrated with other computing or communications elements.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums.

In one embodiment, the VAD system 206 and the voice response system 210, and directories may be modules stored in the memory 204 for execution by the processor 202. In another embodiment, the server may include digital logic or applications utilized to perform the voice activated dialing as herein described.

The VAD system 206 is an interactive interface for initiating a communication to a receiving party by determining dialing information associated with a voice identifier and initiating the call. In one embodiment, the VAD system 206 may initiate the communication by sending a phone number, dialing a command, or other instructions to a local switch, office, or node for completing the telecommunications circuit or connection. In another embodiment, the VAD system 206 may include a transceiver, dialer, switching circuits and/or software, and other similar elements for initiating a voice communication between the telephone 220 and a telephone of the receiving party. The VAD system 206 may access one or more directories or databases to retrieve the dialing information associated with a voice identifier.

In one embodiment, the server 200 may store a global directory, database, or address book. The directory may include the personal directory 222, home directory 224, and the business directory 226. The directories may be stored on the server 200 for utilization by any number of devices. For example, the server 200 may be accessed by a wireless device, client, work VoIP phone, or other communications devices to utilize the stored dialing information. In one embodiment, changes, additions, and modifications made from other devices may be utilized to update the personal directory 222, home directory 224, and the business directory 226. Similarly, a local copy of each directory may be sent to or synchronized with the server from other communications and computing devices, applications, services, and accounts. In one embodiment, the personal directory 222, home directory 224, and the business directory 226 may retrieve contacts categorized into one of the categories from any number of devices and removed redundant contacts or entries. The user may be required to enter a username and password for each account, device or service to communicate directories, and contacts. The VAD system 206 may include voice recognition, speech-to-text, and text-to-speech hardware and software.

The voice response system 210 is the interactive interface for configuring the settings, directories, parameters, and user preferences 208 utilized by the VAD system 206 to make calls based on receipt of a voice identifier. The voice response system 220 may be an IVR configured to present voice prompts, verbal options, and menus that allow the user to provide input and selections for configuring the user preferences 208 and other settings utilized by the VAD system 206.

In one embodiment, the memory 204 or user preferences 208 may store the multiple voice identifiers, each of which is associated with dialing or communication information for calling one or more receiving parties. The dialing information may include a phone number, IP address, username, or other information that may be utilized to initiate and conduct a voice communication from a telephone 220. In one embodiment, the dialing information may be stored in the user preferences 208. The user preferences 208 may store one or more user profiles for users that typically utilize one or more telephones which may include the telephone 220. For example, different speech patterns, accents, commands, or vocals may be associated with one or more voice identifiers. For example, the VAD system 206 may be programmed to dial the user's grandparents based on a voice command through the telephone 220 to "call grandma" from a mother, father, and child of the family.

The telephone 220 may be a POTS, VoIP, or digital phone. The voice identifiers are transmitted from the telephone 220 to the server 200 through the communications network 228. The communications network 218 includes one or more networks, systems, and devices, some of which are described in the communications environment 200 of FIG. 2. The elements of the communications environment 200 may communicate with any number of private or public networks, devices, equipment, and systems not explicitly described herein. The illustrative embodiments may allow a user to call any number of contacts, receiving parties, or others included in a directory or network address book.

Figure 3:
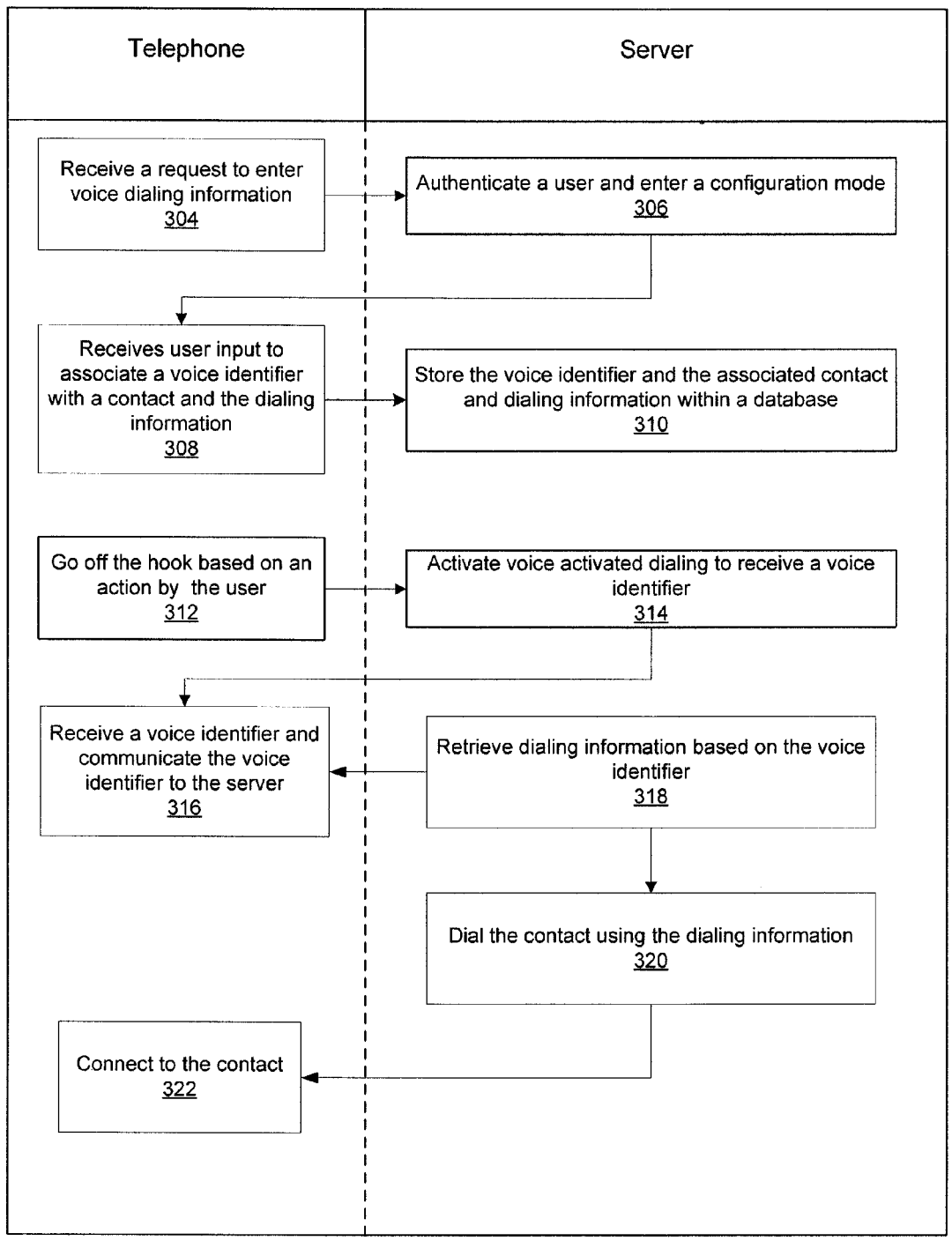
FIG. 3 is a flowchart of a process for voice activated dialing in accordance with an illustrative embodiment.

FIG. 3 is a flowchart of a process for voice activated dialing in accordance with an illustrative embodiment. In one embodiment, the process may be implemented by a telephone and a server. The server may represent or communicate with any number of communications networks, systems, equipment, and devices. The voice activated dialing may be utilized to initiate communications between the telephone and another telephonic device utilized by a receiving party. The process of FIG. 3 may illustrate both configuring the server to perform voice activated dialing and implementating of voice activated dialing based on interaction between the telephone and the server.

The process may begin with the telephone receiving a request to enter voice dialing information (step 304). In one embodiment, the user may speak a programming command, such as "setup" that initiates an IVR available through the server. In another embodiment, configuration of the voice dialing information may occur through a web portal accessible through the server or a web server in communication with the server or through one or more messages sent to the server, including the voice dialing information. The dialing information may include voice identifiers, phone numbers and/or IP addresses, and receiving parties that may be associated or otherwise linked.

Next, the server authenticates a user and enters a configuration mode (step 306). In one embodiment, the user may be authenticated based on a phone number of the telephone. For example, the user may be able to access the server from a home, work, or designated mobile telephones. In another embodiment, the user may be required to speak a keyword, password, or phrase. The server may utilize voice recognition to authenticate that the user is authorized to modify, add, or otherwise access dialing information.

Next, the telephone receives user input to associate a voice identifier with a contact and the dialing information (step 308). The contact may be one or more parties that are called utilizing the voice identifier. For example, a three-way call or conference call may be automatically initiated to multiple parties depending on the capabilities of the telephone. In one embodiment, the contact or receiving party may be selected from a call log, call history, or other information stored by the server. The server stores the voice identifier and the associated contact and dialing information within a database (step 310). Steps 304-310 may be the setup or pre-conditions of voice activated dialing information utilized to perform the steps of 312-322.

The telephone may go off-hook based on an action by the user (step 312). In one embodiment, the user may pick up the receiver or handset activating the telephone connection and corresponding telecommunications equipment, including the server. In another embodiment, the user may select a speaker button, hard-key or soft-key dedicated to preparing the telephone for dialing. For example, the action of the user may be any action that normally allows the telephone to play or present a dial tone to the user. In one embodiment, the telephone may play a special dial tone, prompt, tone, alert, or message indicating that the user may now speak a voice identifier or command. In another embodiment, a specialized dial tone may not be utilized and instead the telephone and server may communicate the voice identifier immediately as spoken by the user.

Next, the server activates voice activated dialing to receive a voice identifier (step 314). In one embodiment, the server may enter an active listening mode or state for utilizing voice recognition and identification systems to determine a receiving party and dialing information associated with the voice identifier to implement a specified action.

Next, the telephone receives a voice identifier and communicates the voice identifier to the server (step 316). The voice identifier may be converted or translated to a format understandable by the server by any number of intermediary devices, which may include nodes, switches, routers, gateways, and other network devices or software applications. The server retrieves dialing information based on the voice identifier (step 318). The dialing information may be retrieved from a directory, database, look-up table, or other information association. The dialing information may specify one or more contacts that are called based on receipt of the voice identifier by the server through the telephone. In one embodiment, the server may present or play verification information to the telephone enabling the user to confirm that the contact associated with the dialing information is the correct selection.

The server dials the contact using the dialing information (step 320). The server may utilize standard processes, standards, or protocols for initiating the call as if the user had keyed in the number, username, or IP address through the telephone like a standard voice communications call. Next, the telephone connects to the contact (step 322). During step 322 the user may carry on a normal voice communication.

Figure 4:
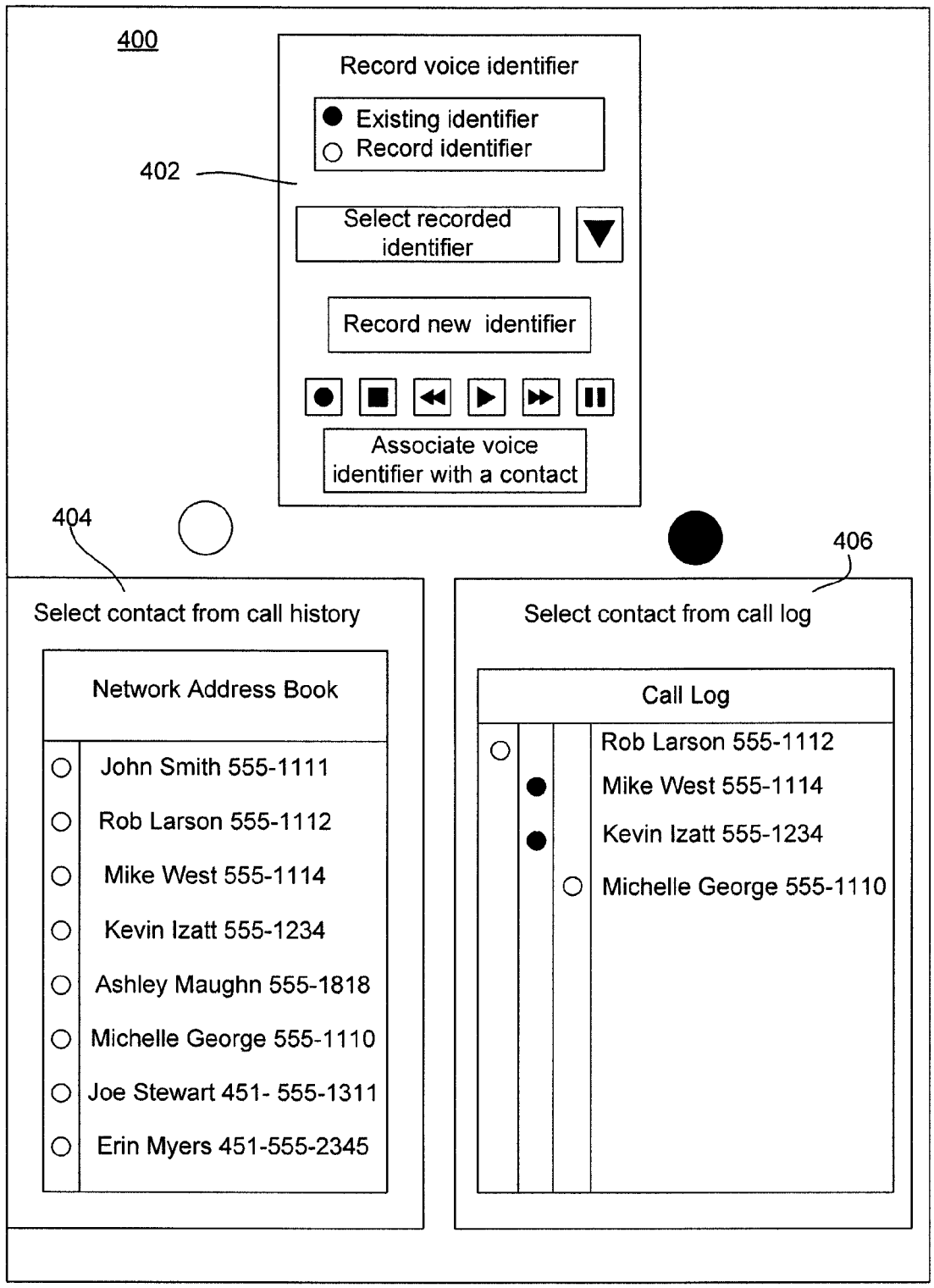
FIG. 4 is a pictorial representation of a graphical user interface (GUI) in accordance with an illustrative embodiment.

FIG. 4 is a pictorial representation of a GUI in accordance with an illustrative embodiment. The GUI 400 is one embodiment of a web portal, application, or other interface that may be presented to a user visually or audibly through an IVR.

The GUI 400 may include any number of windows, selection elements, buttons, icons, data, drop-down menus, controls, hyperlinks, numbers, interactive features, text boxes, or other information. In one embodiment, the GUI 400 may include sections 402, 404, and 406. The section 402 may be utilized to record or modify a voice identifier. The information for section 402 may be received through a client device, including a microphone for recording one or more users' voices. As previously described, multiple voice commands or voice identifiers may be associated with a single receiving party. For example, the way a teenager daughter prefers to implement a call may be different from that of her mother. The teenage daughter may prefer to just say "dad" whereas the mother may say "call Thor" or "call sweetie". Allowing the user to enter different voice identifiers for calling a single party may allow the voice activated dialing feature to be more intuitive, as well as, allowing the voice identifier to be more accurately recognized by the voice activated dialing system. Any number of controls may be utilized to record and store the voice identifier.

Call information is the record, caller identification information, and data tracked for communications to and from one or more telephonic devices. The call information may include a call history, call log, and other relevant information. Section 404 may allow a user to link or associate a voice identifier with a calling party in the call history. For example, the user may have previously called the receiving parties listed in section 404, and as a result, may select to associate a voice identifier with one or mote of the contacts listed in the call history.

Section 406 may similarly allow a user to link or associate a voice identifier with a calling party from the call log. The call log and the call history of sections 404 and 406 may display contact and dialing information that may be linked with the voice identifier.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for remotely enabled voice activated dialing, the method comprising:
    initiating generation of a special dial tone indicating that dialing is available to be initiated by a user by providing a voice identifier;
    receiving the voice identifier over a network from a wired telephone utilized by a user;
    determining dialing information associated with the voice identifier, the dialing information is enabled to be associated with a plurality of user voices and a plurality of voice identifiers;
    dialing a plurality of receiving parties associated with the voice identifier simultaneously as part of a conference call utilizing the dialing information in response to receiving the voice identifier; and
    connecting the wired telephone to the plurality of receiving parties.

2. The method according to claim 1, further comprising:
    receiving a user selection to perform voice activated dialing, wherein the user selection is enabled to be received from a plurality of phones registered for voice activated dialing, wherein the special dial tone is generated in response to the user selection, wherein the voice identifier is communicated from the wired telephone to a server to determine the dialing information associated with the voice identifier, and wherein the wired telephone is a voice over Internet protocol (VoIP) telephone or a plain old telephone service (POTS) telephone.

3. The method according to claim 1, further comprising:
receiving user input associating the voice identifier with the dialing information for one or more receiving parties.

4. The method according to claim 3, wherein the user input is received through an interactive voice response system.

5. The method according to claim 3, further comprising:
displaying call information to the user, wherein the user input is received through a web portal by associating the voice identifier with the one or more receiving parties listed in the call information.

6. The method according to claim 5, further comprising:
retrieving contacts for one or more directories, wherein the one or more directories are a portion of the call information.

7. The method according to claim 1, further comprising:
confirming to the user that the one or more receiving parties are going to be dialed before dialing the one or more receiving parties.

8. The method according to claim 1, further comprising:
performing the dialing based on user preferences.

9. The method according to claim 2, further comprising:
authenticating the user is authorized to provide user input and access the dialing information.

10. A system for voice activated dialing, the system comprising:
a communications network in communication with a wired telephone through a connection, the communications network configured to communicate a voice identifier received from a user of the wired telephone;
a gateway in communication with the communications network, the gateway configured to communicate the voice identifier to a server for implementing voice dialing; and
the server in communication with the communications network, the server configured to:
Initiate generation of a special dial tone indicating that dialing is available to be initiated by a user by providing the voice identifier;
receive the voice identifier over the network from a wired telephone utilized by a user;
determine dialing information associated with the voice identifier, wherein the dialing information is enabled to be associated with a plurality of user voices and a plurality of voice identifiers;
dial a plurality of receiving parties associated with the voice identifier simultaneously as part of a conference call utilizing the dialing information in response to receiving the voice identifier; and
connect the wired telephone to the plurality of receiving parties.

11. The system according to claim 10, wherein the server includes a voice activated dialing server configured to determine the voice identifier based on speech received from the user, and wherein the server includes a network address book server configured to determine the dialing information associated with the voice identifier and the one or more receiving parties.

12. The system according to claim 10, wherein the server further includes one or more databases configured to store a plurality of voice identifiers and dialing information associated with each of the voice identifiers, and wherein the one or more receiving parties include a plurality of receiving parties that are dialed simultaneously as part of a conference call in response to receiving the voice identifier.

13. The system according to claim 12, wherein the one or more databases include a plurality of contacts associated with the one or more receiving parties, and wherein the plurality of contacts are retrieved from one or more databases utilized by the user.

14. The system according to claim 10, wherein the server further includes:
an interactive voice response system configured to associate the voice identifier with the dialing information for calling the one or more receiving parties; and
a web server configured to provide a web portal to a client utilized by the user, wherein the web portal being operable to associate the voice identifier with the dialing information for calling the one or more receiving parties.

15. A server for remotely enabling voice activated dialing comprising:
a processor for executing a set of instructions; and
a memory in communication with the processor, the memory configured to store the set of instructions, the set of instructions are executed to:
initiate generation of a special dial tone indicating that dialing is available to be initiated by a user by providing a voice identifier;
receive the voice identifier over a network from a wired telephone utilized by a user;
determine dialing information associated with the voice identifier, the dialing information is enabled to be associated with a plurality of user voices and a plurality of voice identifiers;
dial one or more receiving parties associated with the voice identifier utilizing the dialing information; and
connect the wired telephone to the one or more receiving parties, wherein the one or more receiving parties include a plurality of receiving parties that are dialed simultaneously as part of a conference call in response to receiving the voice identifier, wherein the special dial tone is no dial tone at all, and wherein the server is operable to receive the voice identifier from the user in response to taking the wired telephone off-hook.

16. The server according to claim 15, the set of instructions are further configured to:
display call information to the user, wherein user input is received through a web portal to associate the voice identifier with the one or more receiving parties listed in the call information.

17. The server according to claim 15, the set of instructions are further configured to:
receive user input associating the voice identifier with the dialing information for communicating with one or more receiving parties; and
receive a user selection to perform voice activated dialing, wherein the user selection is enabled to be received from a plurality of phones registered for voice activated dialing, wherein the special dial tone is generated in response to the user selection, and wherein the voice identifier is communicated from the wired telephone to the server to determine the dialing information associated with the voice identifier.

18. The server according to claim 15, wherein the wired telephone is a voice over internet protocol (VoIP) telephone or a plain old telephone service (POTS) telephone, and the set of instructions are further configured to provide an IVR system and a web portal for associating a voice command from one or more users with the voice identifier and receiving user input associating the voice identifier with the dialing information for calling the one or more receiving parties.

* * * * *